United States Patent
Amano (10) Patent No.: US 12,461,614 B2
(45) Date of Patent: Nov. 4, 2025

(54) INPUT DISPLAY DEVICE

(71) Applicant: ALPS ALPINE CO., LTD., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/896,137

(22) Filed: Sep. 25, 2024

(65) Prior Publication Data

US 2025/0130655 A1 Apr. 24, 2025

(30) Foreign Application Priority Data

Oct. 23, 2023 (JP) .................. 2023-181557

(51) Int. Cl.
*G06F 3/0362* (2013.01)
*G06F 3/044* (2006.01)

(52) U.S. Cl.
CPC ............ *G06F 3/0362* (2013.01); *G06F 3/044* (2013.01)

(58) Field of Classification Search
CPC ............................... G06F 3/0362; G06F 3/044
See application file for complete search history.

(56) References Cited

U.S. PATENT DOCUMENTS

| | | | |
|---|---|---|---|
| 8,199,114 B1 * | 6/2012 | Jaeger ..................... | G06F 3/044 345/184 |
| 9,268,442 B1 | 2/2016 | Hobbs | |
| 11,003,262 B2 * | 5/2021 | Pfau ......................... | G06F 3/02 |
| 2017/0285842 A1 | 10/2017 | Kim et al. | |
| 2018/0364853 A1 * | 12/2018 | Pahud .................... | G06F 3/0393 |
| 2019/0391671 A1 * | 12/2019 | Pfau ...................... | G06F 3/0362 |
| 2020/0097119 A1 * | 3/2020 | Pahud .................... | G06F 3/0393 |
| 2024/0126408 A1 * | 4/2024 | Amano ................. | G06F 3/0362 |
| 2024/0201800 A1 * | 6/2024 | Amano .............. | G06F 3/04847 |

FOREIGN PATENT DOCUMENTS

| | | |
|---|---|---|
| EP | 4354264 | 4/2024 |
| JP | 2020-190832 | 11/2020 |
| WO | 2018/231353 | 12/2018 |

OTHER PUBLICATIONS

Extended European search report for EP24207468.0 mailed on Feb. 27, 2025.

* cited by examiner

*Primary Examiner* — Michael Pervan
(74) *Attorney, Agent, or Firm* — IPUSA, PLLC (57) ABSTRACT

An input display device that includes: a display configured to display an image; a touch sensor of a capacitive type mounted on the display; a plurality of three-dimensional operation portions mounted over the touch sensor and capacitively coupled to the touch sensor; a distance detector configured to detect a distance, that is the distance from an operation object to the touch sensor, of the three-dimensional operation portion receiving an operation by the operation object among the three-dimensional operation portions; a position detector configured to detect a position of the operation object, in response to the operation to the three-dimensional operation portion by the operation object; and a determiner configured to determine the three-dimensional operation portion being operated by the operation object, among the three-dimensional operation portions, based on the distance detected by the distance detector and the position detected by the position detector.

6 Claims, 8 Drawing Sheets

INPUT DISPLAY DEVICE

CROSS-REFERENCE TO RELATED APPLICATIONS

The present application is based on and claims priority to Japanese Patent Application No. 2023-181557 filed on Oct. 23, 2023, the entire contents of which are hereby incorporated by reference.

BACKGROUND

1. Field of the Invention

The present disclosure relates to an input display device supporting a human-machine interface function, and more particularly, to an input display device including a three-dimensional operation portion.

2. Description of the Related Art

Disclosed is an input display device which is provided with a convex portion on a touch panel superposed on a display, and displays an image such as an operation icon at a position overlapping with the convex portion (for example, Japanese Laid-Open Patent Application No. 2020-190832). A user performs an input by touching the convex portion.

SUMMARY

An input display device is provided with a display configured to display an image; a touch sensor of a capacitive type mounted on the display; a plurality of three-dimensional operation portions mounted over the touch sensor and capacitively coupled to the touch sensor; a distance detector configured to detect a distance, that is the distance from an operation object to the touch sensor, of the three-dimensional operation portion receiving an operation by the operation object among the three-dimensional operation portions; a position detector configured to detect a position of the operation object, in response to the operation to the three-dimensional operation portion by the operation object; and a determiner configured to determine the three-dimensional operation portion being operated by the operation object, among the three-dimensional operation portions, based on the distance detected by the distance detector and the position detected by the position detector.

In one embodiment, the input display device further includes an analyzer for analyzing a moving direction of the position detected by the position detector, and the determiner further determines the three-dimensional operation portion being operated by the operation object, among the three-dimensional operation portions, in consideration of the moving direction analyzed by the analyzer. In one embodiment, the three-dimensional operation portions respectively includes an operable portion that has a three-dimensional shape to be operated by the operation object, the operable portion being different from one another, and a height of the operable portion respectively provided in the three-dimensional operation portion is different from another. In one embodiment, when the three-dimensional operation portions are arranged adjacent to each other, a detected position of the operation object of one three-dimensional operation portion overlaps with a detected position of the operation object of the other three-dimensional operation portion. In one embodiment, the three-dimensional operation portions include a rotary three-dimensional operation portion and a slider-type three-dimensional operation portion. The analyzer analyzes whether the moving direction of the detected position is a circumferential direction or a linear direction. The determiner determines that the rotary three-dimensional operation portion is operated when the moving direction is analyzed to be the circumferential direction, and determines that the slider-type three-dimensional operation portion is operated when the moving direction is analyzed to be the linear direction. In one embodiment, the display is an on-vehicle display.

EMBODIMENTS OF THE DISCLOSURE

In a display device for performing a capacitive touch operation, a user interface (hereinafter, referred to as three-dimensional UI) has been proposed in which a touch position is recognized tactilely by providing a cover glass with an uneven shape, and the touch position can be recognized without close observation.

Figure 1A:
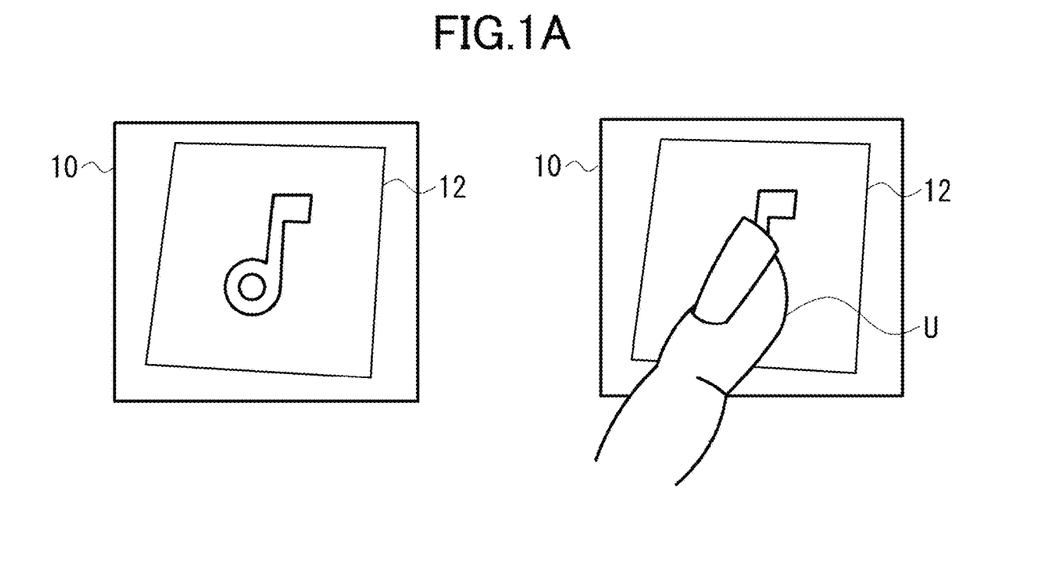
FIG. 1A is a diagram illustrating an operation example of a flat touch panel.

FIG. 1A is an operation example of an existing flat touch panel, and a user U visually recognizes an operation icon 12 displayed on a display 10 and performs an input by performing a touch operation on the position of the operation icon 12 (a note is used in an example illustrated in the figure).

Figure 1B:
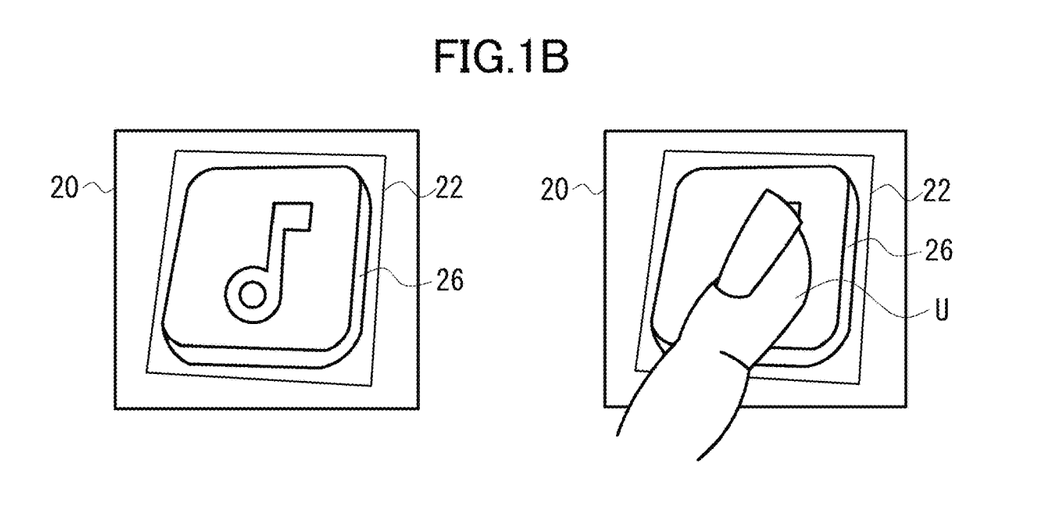
FIG. 1B is a diagram illustrating an operation example of a touch panel of a three-dimensional UI.
Figure 1C:
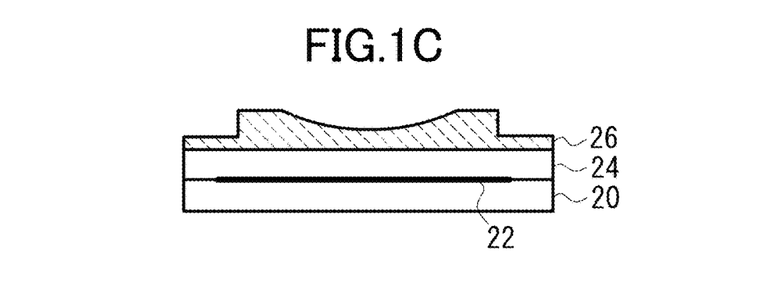
FIG. 1C is a schematic cross-sectional view of the three-dimensional UI.

FIG. 1B is an operation example of a touch panel including a three-dimensional operation portion (three-dimensional portion) using the three-dimensional UI, and FIG. 1C is a schematic cross-sectional view of the three-dimensional operation portion. A cover lens 26 that is transparent and including a three-dimensional operation portion having an uneven shape is mounted over a touch sensor (touch panel) 24 including a capacitive sensor, and the display 20 displays an operation icon 22 at a position overlapping with the cover lens 26. The user U performs an input by touching the cover lens 26 with a finger. For a touch detection, a high-sensitivity electrostatic sensor configured to detect a capacitance (distance) of the finger even when separated in distance from the sensor is used, and presence or absence of a touch can be determined even from above the cover lens 26 that has thickness. This makes it possible to reduce touch errors (operation errors) under a situation where it is difficult to closely observe an on-vehicle display during driving.

Figure 2A:
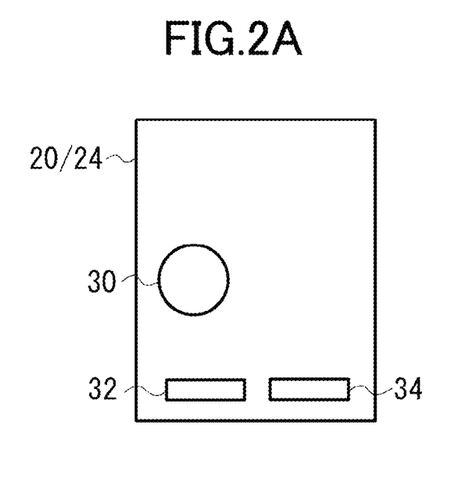
FIGS. 2A and 2B are diagrams illustrating examples of layout of a plurality of three-dimensional operation portions.
Figure 2B:
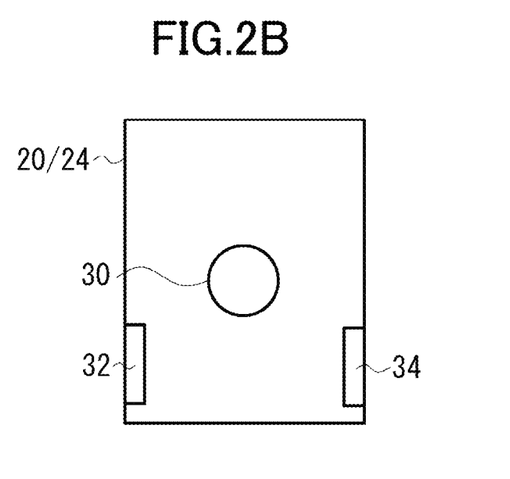

Further, in the three-dimensional UI, since a movable mechanism such as a mechanical switch is not required for the three-dimensional operation portion, there are few restrictions on an installation position of the three-dimensional operation portion, and the three-dimensional operation portion (three-dimensional portion) can be freely arranged on the touch panel. FIG. 2A illustrates an example in which a three-dimensional operation portion 30 having a button-shape and three-dimensional operation portions 32 and 34 having a rectangular shape are arranged over the touch sensor (touch panel) 24. The three-dimensional operation portions 30, 32, and 34 are not limited to being integrally molded on a cover glass, but can be removably attached to the cover glass by an adhesive or the like. For example, a layout as illustrated in FIG. 2A can be changed to a layout as illustrated in FIG. 2B, and layout (replacement) of the three-dimensional operation portions can be freely changed to a convenient layout for each user.

As a result of freely arranging the three-dimensional operation portions according to the user's preference, due to adaptability to various arrangement positions of the three-dimensional operation portions, the three-dimensional operation portions may come close to each other, and in this case, interference in the detection area of the operation position may occur.

Figure 3:
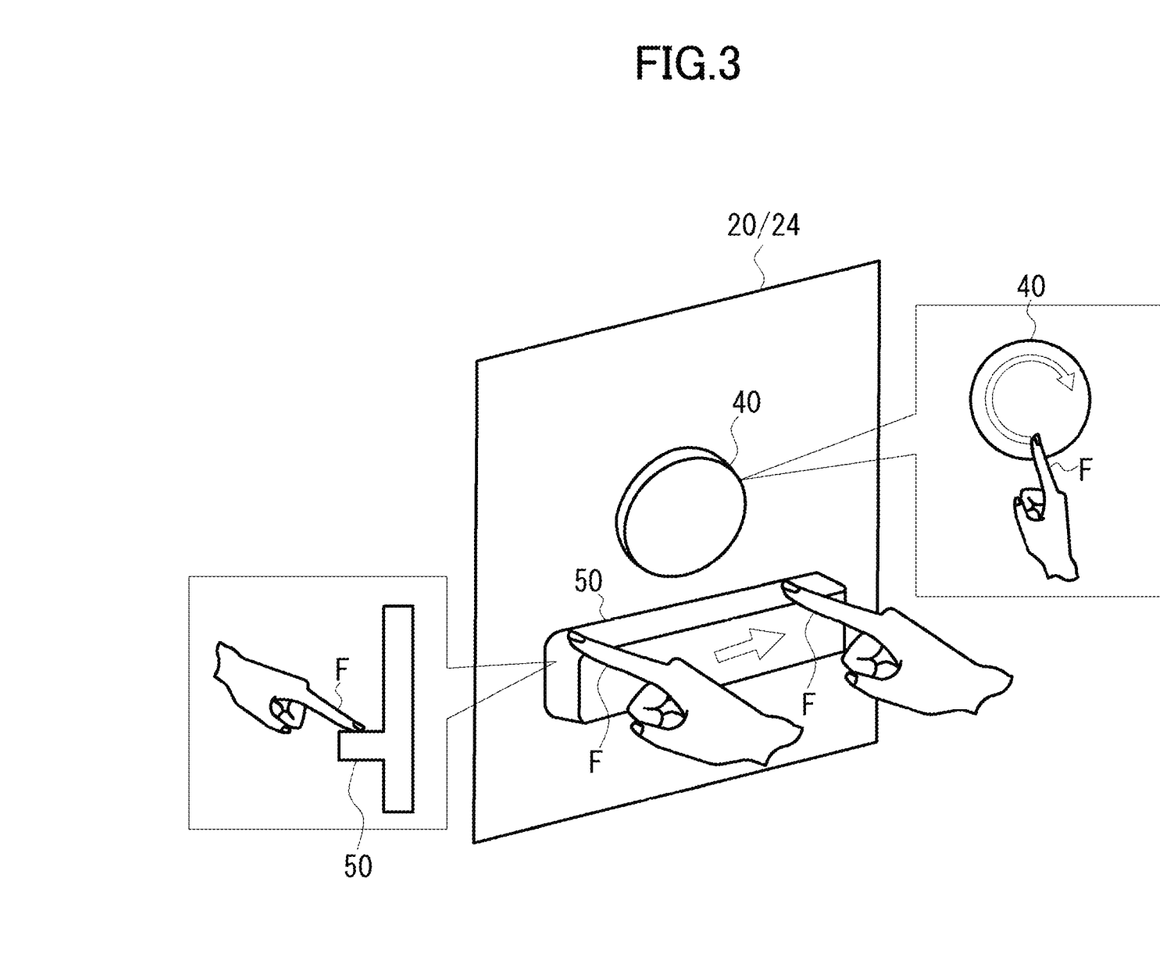
FIG. 3 is a diagram illustrating an issue when a rotary three-dimensional operation portion and a slider-type three-dimensional operation portion are arranged adjacent to each other.

FIG. 3 illustrates an example of a layout in which a rotary three-dimensional operation portion 40 and a slider (rectangular parallelepiped) three-dimensional operation portion 50 are adjacent to each other over the touch sensor (touch panel) 24. When operating the rotary three-dimensional operation portion 40, a user slides his or her finger F on a rotary surface so as to rotate. When operating a slider-type three-dimensional operation portion 50, the user linearly slides his or her finger F on the top surface of the slider. However, in such a layout, detection areas of a lower portion of the rotary three-dimensional operation portion 40 and a center portion of the top surface of the slider-type three-dimensional operation portion 50 overlap when viewed from the front, and when an operation of the other three-dimensional operation portion is detected while one of the three-dimensional operation portions is operated, detection accuracy of the operation on the three-dimensional operation portions lowers.

Therefore, even when the detection areas of the three-dimensional operation portions overlap (or are very close to each other) in the layout, there is a need for a method of detecting only the operation on an intended three-dimensional operation portion. For example, in the example of FIG. 3, it is necessary to prevent an operation of the rotary three-dimensional operation portion 40 from being detected when the slider-type three-dimensional operation portion 50 is operated.

The present disclosure provides an input display device capable of accurately detecting the operation on the three-dimensional operation portion.

An input display device of the present disclosure provides an interface between a person and a machine. The input display device of the present disclosure is not particularly limited, but is applicable to, for example, an electronic device mounted with a display including a touch panel. The electronic device mounted with a display including a touch panel is, for example, an on-vehicle device equipped with a navigation function, an audio-visual function, a television function, and the like.

Next, an embodiment of the present disclosure will be described. In the present embodiment, when detection areas of a plurality of three-dimensional operation portions overlap or are laid out close to each other, an operation to the three-dimensional operation portion is determined from the following two viewpoints in combination, so that an intended operation to the three-dimensional operation portion can be detected. 1. In addition to detecting a touch position in a vertical direction and a horizontal direction (XY space), a distance of a finger in a front-rear direction (Z direction) from a touch sensor is also detected to determine the three-dimensional operation portion. 2. A moving direction of the finger is detected to determine the three-dimensional operation portion.

Figure 4A:
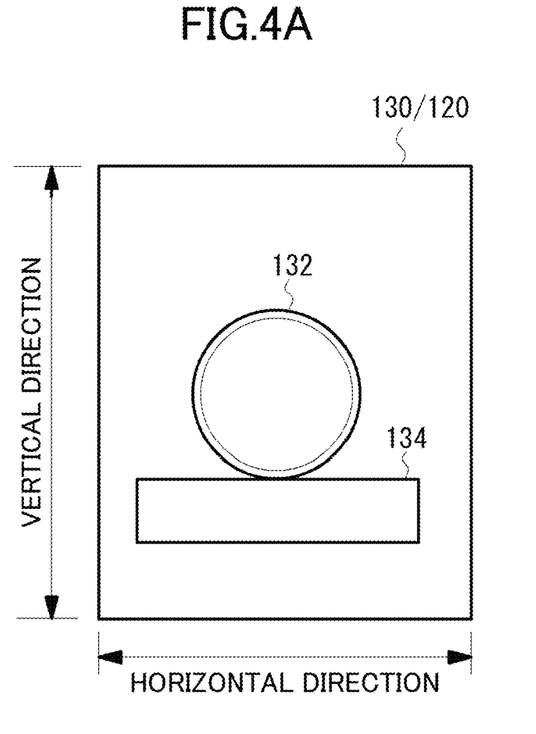
FIGS. 4A to 4E are diagrams illustrating an overview of the input display device of the present disclosure.
Figure 4B:
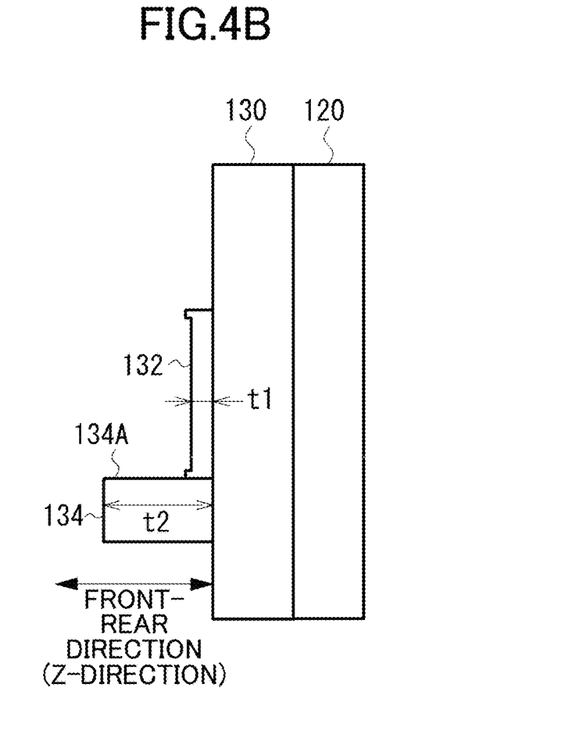

FIGS. 4A and 4B illustrate an example in which a rotary three-dimensional operation portion 132 and a slider-type three-dimensional operation portion 134 are arranged close to each other on a cover glass 130. The two three-dimensional operation portions 132 and 134 may be integrally molded with the cover glass 130, or may be mounted on the cover glass 130 via an adhesive or the like.

The rotary three-dimensional operation portion 132 is a circular protrusion having a height t1, and a circular edge is formed on an outer periphery of a surface of the rotary three-dimensional operation portion 132. When a user operates the three-dimensional operation portion 132, the user rotates the finger F so as to trace the edge of the outer periphery, and inputs an amount of rotation of the finger.

The slider-type three-dimensional operation portion 134 is a substantially rectangular parallelepiped protrusion having a height t2, and the height t2 is greater than the height t1 of the rotary three-dimensional operation portion 132. When the user operates the slider-type three-dimensional operation portion 134, the user moves his or her finger F so as to trace a top surface 134A in the horizontal direction or the longitudinal direction, and inputs an amount of finger movement.

A capacitive touch sensor 120 (hereinafter, referred to as touch sensor 120) is disposed directly under the cover glass 130, and can detect a touch position of the finger in a two-dimensional space (XY space) in the horizontal direction and the vertical direction as illustrated in FIG. 4A, and can detect the distance of the finger in the front-rear direction (Z direction) of the cover glass 130 as illustrated in FIG. 4B.

Figure 4C:
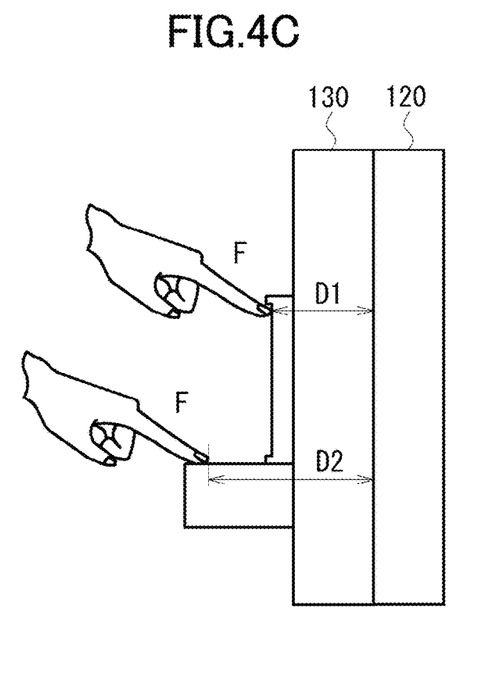

As illustrated in FIG. 4C, when the user operates the rotary three-dimensional operation portion 132, a finger distance D1 that is a distance from the finger F to the touch sensor 120 is approximately a size obtained by adding a thickness of the cover glass 130 and the height t1 of the rotary three-dimensional operation portion 132.

On the other hand, when the user operates the slider-type three-dimensional operation portion 134, a finger distance D2 that is a distance from the finger F to the touch sensor 120 is greater than the finger distance D1 when the user operates the rotary three-dimensional operation portion 132 because the user traces the top surface 134A in the left-right direction or the front-back direction with his or her finger F. In other words, the finger distance D1 when the user operates the rotary three-dimensional operation portion 132 is smaller than the finger distance D2 when the slider-type three-dimensional operation portion 134 is operated, and the difference between the finger distances D1 and D2 is reflected in a difference in capacitance detected by the touch sensor 120 (capacitance at the finger distance D1>capacitance at the finger distance D2). Therefore, by setting a threshold value between the capacitances corresponding to the finger distances D1 and D2, it is possible to determine which three-dimensional operation portion the user is operating.

Figure 4D:
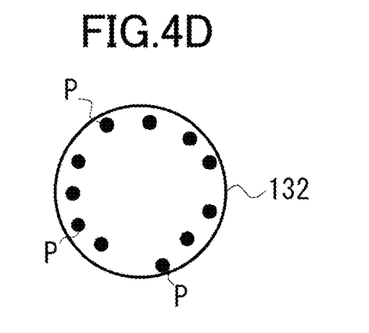

Next, an analysis of the moving direction of the finger will be described. In the determination based on the difference between the finger distances D1 and D2 described above, it is considered that the user may move his or her finger F closer to the touch sensor 120 when operating the slider. In order to cope with this, the moving direction of the finger detected is also observed to determine a type of the three-dimensional operation portion the user is operating. For example, as illustrated in FIG. 4D, in a case of the operation of the rotary three-dimensional operation portion 132, the detection coordinate point P of the finger is moved in a circumferential path, and in a case of the operation of the slider-type three-dimensional operation portion 134, the detection coordinate point P of the finger is moved in parallel to the horizontal direction. Therefore, when the direction of movement of the finger indicates a circumferential path, the three-dimensional operation portion can be determined to be a rotary type, and when the direction of movement of the finger is horizontal or linear, the three-dimensional operation portion can be determined to be a slide type.

Thus, according to the present embodiment, even when the detection area of the adjacent three-dimensional operation portion overlaps or is close, the three-dimensional operation portion intended by the user can be determined, and the operation to the three-dimensional operation portion can be detected. In practice, the present determination condition can be applied not only to the combination of the rotary three-dimensional operation portion 132 and the slider-type three-dimensional operation portion 134 as illustrated in FIG. 4, but also to other combinations of the three-dimensional operation portions in which a difference in finger distance in the front-rear direction can occur. Other combinations of the three-dimensional operation portions will be described in the following example.

EXAMPLES

Figure 5A:
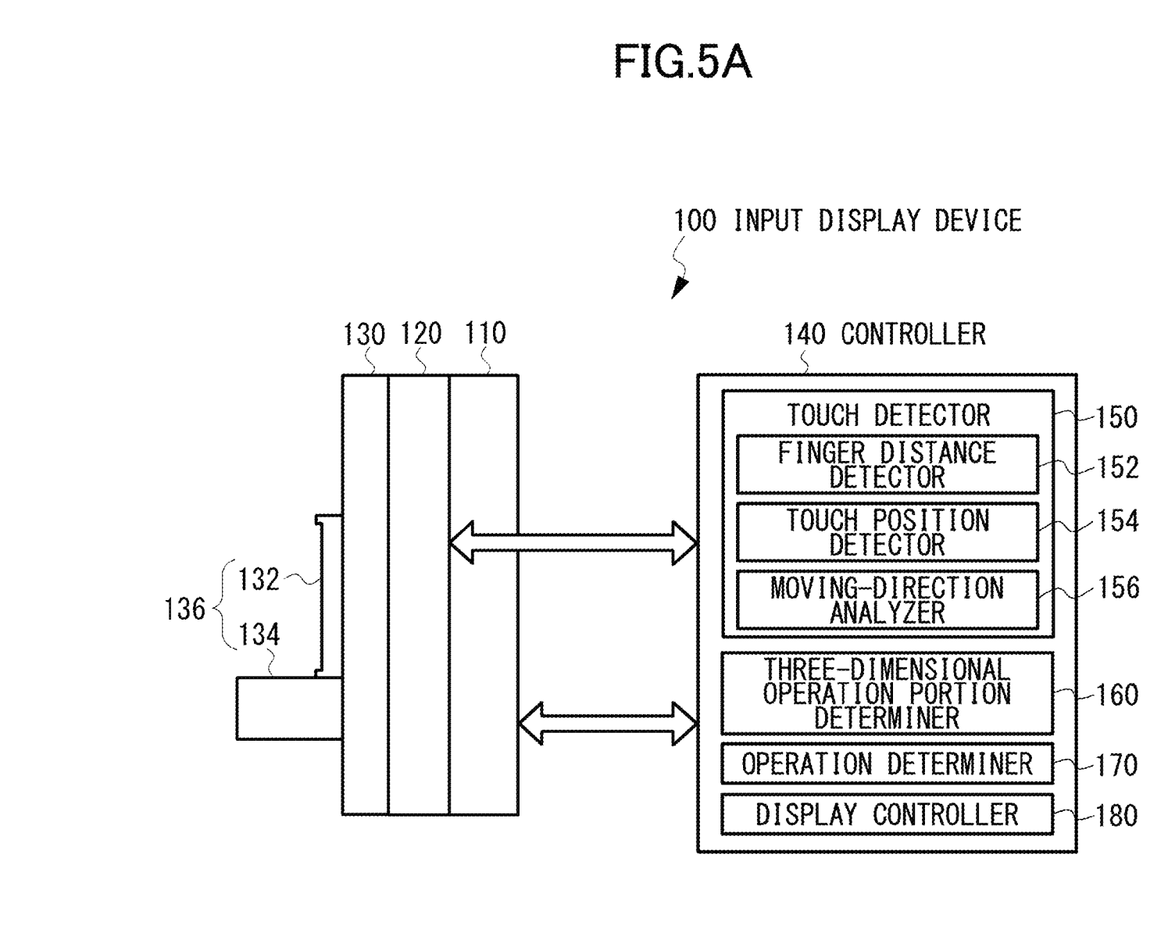
FIG. 5A is a diagram illustrating a configuration of an input display device according to one example of the present disclosure.

Next, an example of the present disclosure will be described in detail with reference to the drawings. FIG. 5A is a block diagram illustrating a configuration of an input display device according to an example of the present disclosure. The input display device 100 of the present example includes a display 110 for displaying an image or video, the touch sensor 120 including a capacitive sensor mounted on the display 110, a cover glass 130 mounted on a surface of the touch sensor 120 and including a three-dimensional operation portion (three-dimensional portion) 136 as the three-dimensional UI, and a controller 140 for controlling image display of the display 110 and touch detection of the touch sensor 120, and the like.

The display 110 is not particularly limited, but includes, for example, a liquid crystal panel or an organic EL panel, and displays image data provided from the controller 140. For example, an operation icon representing an input operation may be displayed at positions corresponding to the three-dimensional operation portions 132 and 134.

The touch sensor 120 includes, for example, a plurality of sensors (detectors) formed at positions where a plurality of X-side and Y-side electrode lines intersect, and the sensors detect capacitance when a user's finger or hand approaches or contacts the cover glass 130 or the three-dimensional operation portion 136. The touch sensor 120 is mounted on the display 110 and provides an input interface for a user to perform an input to an icon or the like displayed on the display 110.

The cover glass 130 is attached to the surface of the touch sensor 120. The cover glass 130 may be a part of the touch sensor 120 or may be provided separately from the touch sensor 120.

On the cover glass 130, a plurality of the three-dimensional operation portions 136 such as the rotary three-dimensional operation portion 132 and the slider-type three-dimensional operation portion 134 are mounted. The three-dimensional operation portion 134 includes a protrusion coupled capacitively with the touch sensor 120, and the protrusion allows the user to operate at a position apart from the cover glass 130.

Figure 5B:
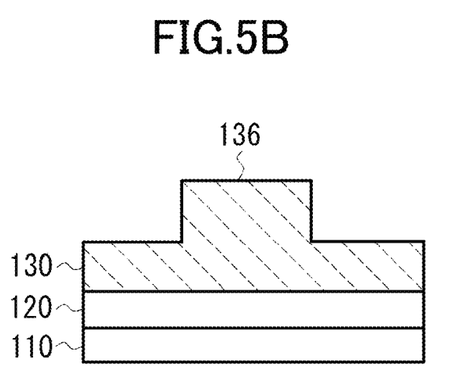
FIGS. 5B and 5C are diagrams illustrating examples of how a three-dimensional operation portion is formed.
Figure 5C:
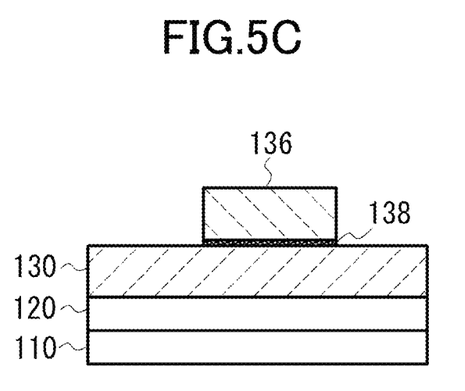

The three-dimensional operation portion 136 may be formed integrally with the cover glass 130 as illustrated in FIG. 5B, or may be formed separately from the cover glass 130 as illustrated in FIG. 5C. For example, a bottom surface of the three-dimensional operation portion 136 may be attached to the cover glass 130 with a double-sided adhesive 138. In this case, the three-dimensional operation portion 136 may be formed of a material different from the cover glass 130, such as acrylic or polycarbonate.

Figure 6A:
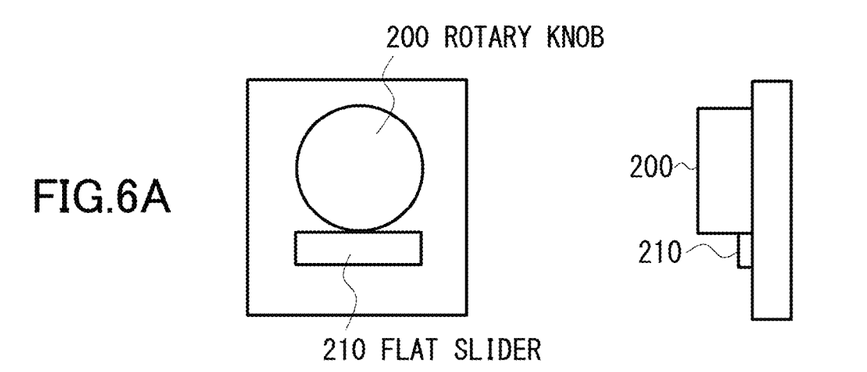
FIGS. 6A to 6D are diagrams illustrating examples of a combination of a plurality of three-dimensional operation portions.

A shape, size, thickness, and material of the three-dimensional operation portion 136 are not particularly limited, but for example, the three-dimensional operation portion 136 may be the rotary three-dimensional operation portion 132 and the slider-type three-dimensional operation portion 134 as illustrated in FIG. 5A. In addition to the combination of the three-dimensional operation portions 132 and 134 as illustrated in FIG. 5A, the three-dimensional operation portion 136 may be, for example, a combination of a rotary knob 200 and a flat slider 210 as illustrated in FIG. 6A, a combination of a rotary knob 220 and a flat rotary 230 as illustrated in FIG. 6B, or a combination of a flat slider 240 and a projecting slider 250 as illustrated in FIG. 6C.

The rotary knob 200 has a pinch-type rotary shape and is operated by pinching (gripping) a wall surface part, and a protruding portion of the rotary knob 200 has a certain height. The flat slider 210 has a substantially rectangular parallelepiped projection and is operated by tracing a top surface in the vertical and horizontal directions, and a height of the protruding portion is smaller than that of the rotary knob 200. When the rotary knob 200 and the flat slider 210 are laid out as illustrated in FIG. 6A, a touch position when the rotary knob 200 is pinched is very close to a touch position when the top surface of the flat slider 210 is operated.

Figure 6B:
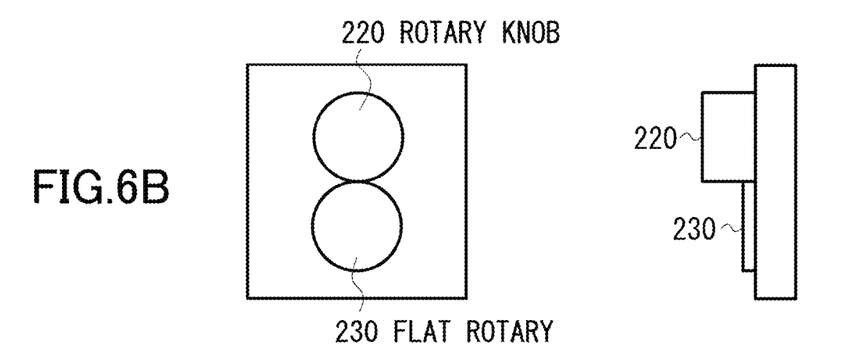

The flat rotary 230 as illustrated in FIG. 6B has a rotary shape, includes an edge on an outer periphery, and is operated by tracing along the edge, and a height of a protruding portion is smaller than that of the rotary knob 220. Also, in this case, a touch position when the rotary knob 220 is pinched is very close to a tracing position of the flat rotary 230.

Figure 6C:
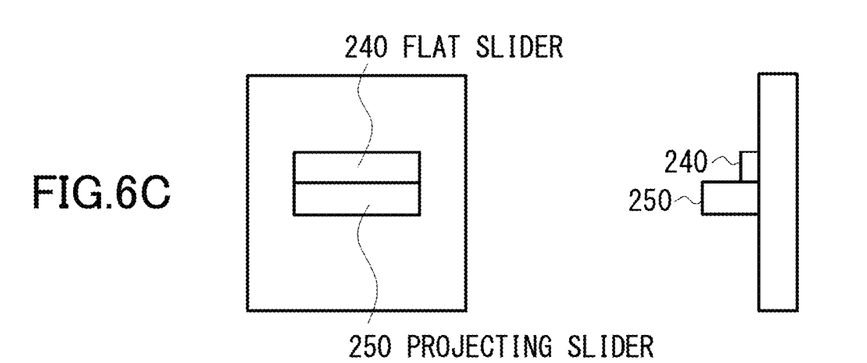

The projecting slider 250 as illustrated in FIG. 6C is operated by placing a finger on upper, lower, left, or right surfaces of a slider-like protruding portion, and a height of the protruding portion is greater than that of the flat slider 240. Also, in this case, the position when a top surface of the projecting slider 250 is operated is very close to a tracing position of the flat slider 240.

Figure 6D:
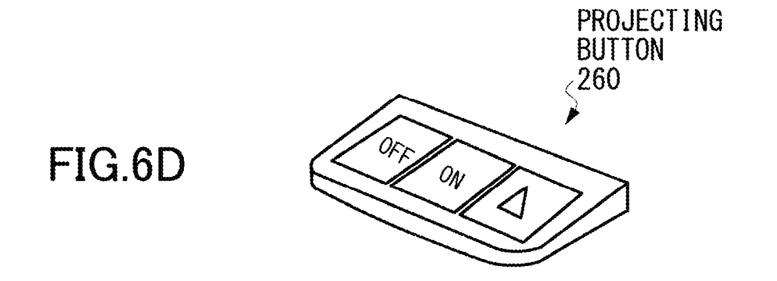

In addition to the above, there are also three-dimensional operation portions such as a flat button and a projecting button, and when these three-dimensional operation portions are combined, their detection areas may come very close to each other. A touch operation to the flat button is performed on a flat surface as in an ordinary touch panel (see FIG. 1B), and a touch operation to the projecting button is performed by placing a finger on a keyboard as illustrated in FIG. 6D.

The three-dimensional operation portion 136 does not necessarily need to be transparent, but characters, symbols, figures, and the like representing the content of the input operation may be drawn on it. An operation surface of the three-dimensional operation portion 136 does not necessarily need to be flat, but may include some unevenness, be linearly inclined, or be curved.

A coordinate position of the three-dimensional operation portion 136 over the touch sensor 120 is registered in a memory of the controller 140, and when a finger approaching the touch sensor 120 is detected, the controller 140 determines whether or not the finger is operating the three-dimensional operation portion 136. Information on the height (t1 and t2 in FIG. 4B) of the mounted three-dimensional operation portion is also registered in the memory of the controller 140. The controller 140 can display an icon representing an input operation near the three-dimensional operation portion 136 via the display 110. The user visually recognizes the icon drawn on the three-dimensional operation portion 136 or the icon displayed on the display 110, and performs an input operation via the three-dimensional operation portion 136.

The controller 140 includes hardware and/or software resources, and performs overall processing of the input display device by using, for example, an arithmetic processor and a microcontroller including a ROM/RAM. For example, the controller 140 performs display processing of the display 110, performs touch detection and operation determination (detection of a touch position and a finger distance, determination of a three-dimensional operation portion being operated, and determination of presence/absence of a touch operation) based on an output value from the touch sensor 120, and performs video display/video switching processing in accordance therewith.

In one embodiment, as illustrated in FIG. 5A, the controller 140 includes a touch detector 150, a three-dimensional operation portion determiner 160, an operation determiner 170, and a display controller 180. The touch detector 150 drives a plurality of electrode lines on the X-side and/or the Y-side of the touch sensor 120, measures capacitance of each detector (sensor) of a driven electrode line, and detects a touch position based on a measurement result.

Figure 4E:
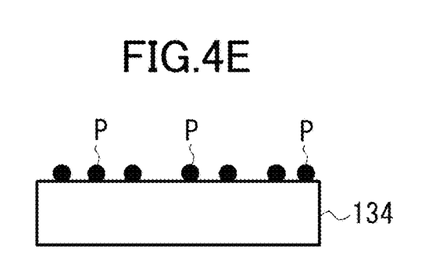

The touch detector 150 further includes a finger distance detector 152, a touch position detector 154, and a moving-direction analyzer 156. The finger distance detector 152 detects the finger distances D1 and D2 when the three-dimensional operation portions 132 and 134 are operated, as illustrated in FIG. 4C, from magnitude of the detected capacitance. The touch position detector 154 detects the touch positions of the finger on the three-dimensional operation portions 132 and 134. The moving-direction analyzer 156 analyzes a moving direction (e.g. circumferential direction or linear direction) as illustrated in FIGS. 4D and 4E from the touch position detected by the touch position detector 154.

The three-dimensional operation portion determiner 160 determines which three-dimensional operation portion is being operated based on a detection result from the touch detector 150. Specifically, the three-dimensional operation portion determiner 160 determines which three-dimensional operation portion is being operated based on the finger distance detected by the finger distance detector 152, the touch position detected by the touch position detector 154, and the moving direction of the finger analyzed by the moving-direction analyzer 156.

The operation determiner 170 determines a touch operation to the display 110 and an operation to the three-dimensional operation portion 136 based on the detection result from the touch detector 150 and a determination result from the three-dimensional operation portion determiner 160. For example, the operation determiner 170 determines a touch operation to the display 110 and a touch operation to the three-dimensional operation portion 136 based on a change in the capacitance of the corresponding detector (sensor), or a swipe operation of a finger, a rotation operation, or a slide operation of the three-dimensional operation portion 136 based on a change in the detected touch position. The operation determiner 170 stores information such as coordinates and size of the three-dimensional operation portion 136.

The display controller 180 causes the display 110 to display an image or a video image, or display an icon at a position corresponding to the three-dimensional operation portion 136 as required. When no icon is drawn on an operation surface of the three-dimensional operation portion 136, an icon representing the operation content of the three-dimensional operation portion 136 can be displayed on the display 110. In addition, the display controller 180 switches the image displayed on the display 110 to another image in response to the determination of the operation by the operation determiner 170.

Figure 7:
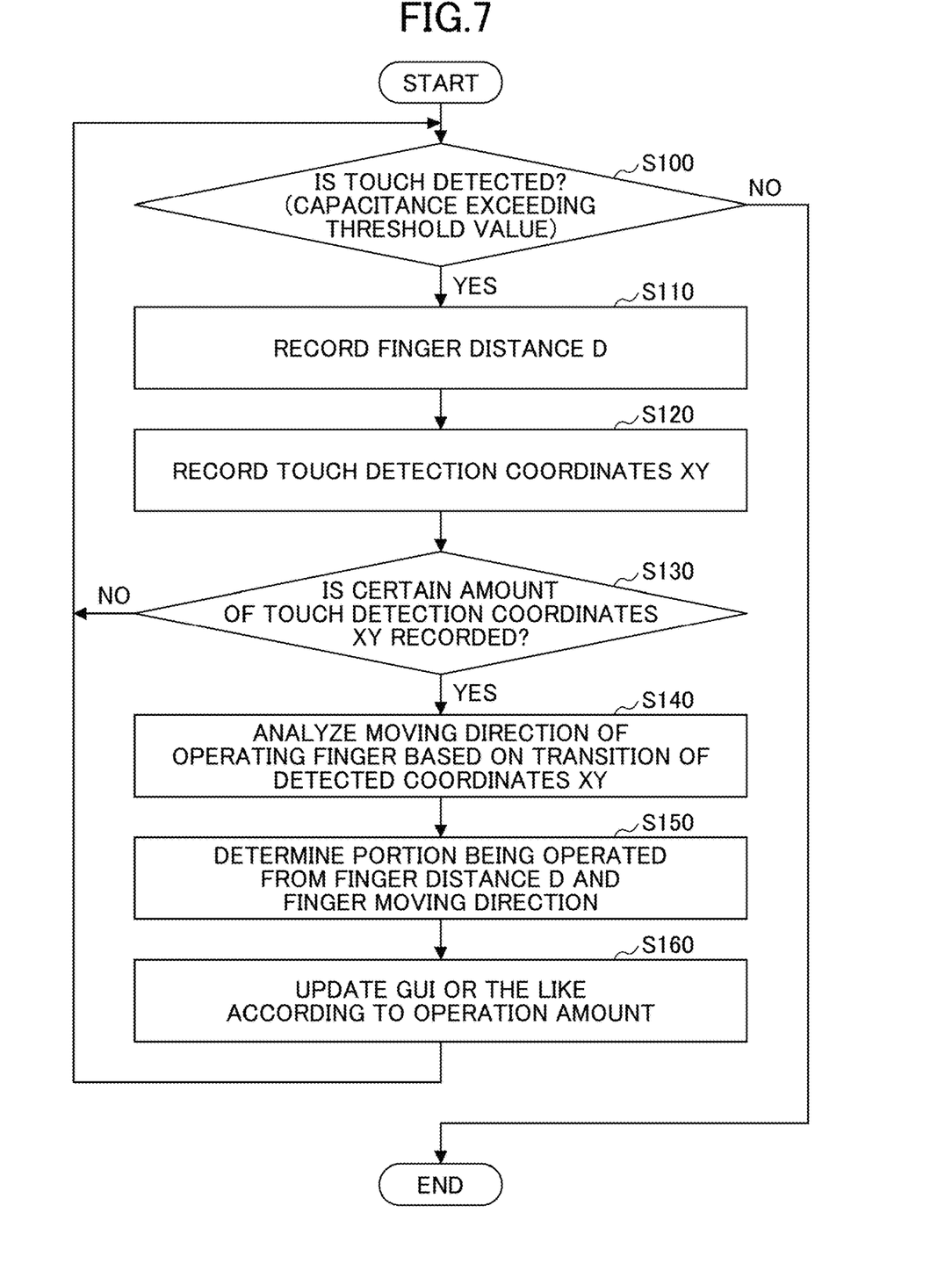
FIG. 7 is a flow diagram illustrating an algorithm for detecting an operation to the three-dimensional operation portion according to the embodiment of the present disclosure.

Next, an algorithm for detecting an operation of the three-dimensional operation portion of the input display device according to the present example will be described with reference to a flow illustrated in FIG. 7. First, the touch detector 150 determines whether or not a touch is detected based on measured electrostatic capacitance (S100). Specifically, it is determined that a touch is detected when the electrostatic capacitance is equal to or greater than a threshold value.

When it is determined that a touch is detected, the finger distance detector 152 detects a finger distance D from the magnitude of the electrostatic capacitance and records it in a memory (S110). The finger distance D is the distance from the touch sensor 120 to the finger F (see FIG. 4C). The touch position detector 154 detects coordinates XY of the touch position and records them in a memory (S120). For example, when the user operates the rotary three-dimensional operation portion 132 (see FIG. 4), the finger distance detector 152 detects the finger distance D1, and the touch position detector 154 detects the detection coordinate point P of where the finger F touches the three-dimensional operation portion 132.

Next, the moving-direction analyzer 156 determines whether or not a certain amount of the coordinates XY of the touch detection has been recorded (S130). When a certain amount has been recorded, the moving-direction analyzer 156 analyzes the moving direction of the finger F based on a transition of the coordinates XY of the touch position (S140). For example, movement in the circumferential direction as illustrated in FIG. 4D or movement in the linear direction as illustrated in FIG. 4E is analyzed.

Next, the three-dimensional operation portion determiner 160 determines which three-dimensional operation portion (three-dimensional portion) is being operated based on the finger distance D and the moving direction of the finger (S150). The three-dimensional operation portion determiner 160 compares, for example, a reference value calculated in accordance with the heights (t1 and t2 in FIG. 4B) of the three-dimensional operation portions with the detected finger distance, and determines which three-dimensional operation portion is being operated. In addition to the determination of the finger distance, a type of the three-dimensional operation portion is determined based on the moving direction of the finger, and finally it is possible to determine which three-dimensional operation portion is being operated. When the moving direction of the finger indicates a circumferential path, a weighted requirement is that the rotation system three-dimensional operation portion is being operated, and when the moving direction of the finger indicates a horizontal movement, a weighted requirement is that the slider system three-dimensional operation portion is being operated.

The determination result from the three-dimensional operation portion determiner 160 is provided to the operation determiner 170, and the operation determiner 170 determines an amount of the operation to the three-dimensional operation portion determined by the three-dimensional operation portion determiner 160 based on the detection result from the touch detector 150. For example, when it is determined that the rotary three-dimensional operation portion 132 is being operated, a rotation angle (amount of rotation) by the operation is determined, and when it is determined that the slider-type three-dimensional operation portion 134 is being operated, an amount of finger movement by the operation is determined. Once the amount of the operation to the three-dimensional operation portion is determined, the display controller 180 updates a GUI or the like according to the operation amount (S160).

Additionally, when the XY coordinates of the touch position are not recorded by a certain amount in step S130, the process returns to the start, the presence/absence of the touch is determined each time, and when a finger is not in contact (when a touch is not detected), the processing ends.

As described above, according to the present example, which three-dimensional operation portion is being operated is determined based on the finger distance and the direction of finger movement when the three-dimensional operation portion is touched, so that the operation of the three-dimensional operation portion being operated can be accurately detected even when a plurality of three-dimensional operation portions are arranged close to each other.

According to the present disclosure, since the three-dimensional operation portion being operated is determined based on a finger distance from an operation object to a touch sensor when the three-dimensional operation portion is operated, the operation of the three-dimensional operation portion being operated can be accurately detected even when the three-dimensional operation portions are laid out close to each other.

Although one preferred embodiment of the present invention has been described above in detail, the present invention is not limited to a specific embodiment, and various modifications and changes are possible within the scope of the gist of the invention described in the claims.

What is claimed is:

1. An input display device, comprising:
 a display configured to display an image;
 a touch sensor of a capacitive type mounted on the display;
 a plurality of three-dimensional operation portions mounted over the touch sensor and capacitively coupled to the touch sensor;
 a distance detector configured to detect a distance from an operation object to the touch sensor, in response to an operation by the operation object on a three-dimensional operation portion among the three-dimensional operation portions; and
 a determiner configured to determine which one of the three-dimensional operation portions is operated by the operation object, based on the distance detected by the distance detector.

2. The input display device according to claim 1, further comprising:
 a position detector configured to detect a position of the operation object, in response to the operation on the three-dimensional operation portion by the operation object; and
 an analyzer configured to analyze a moving direction of the position detected by the position detector, wherein
 the determiner further determines the three-dimensional operation portion being operated by the operation object, among the three-dimensional operation portions, in consideration of the moving direction analyzed by the analyzer.

3. The input display device according to claim 2, wherein
 the three-dimensional operation portions include a rotary three-dimensional operation portion and a slider-type three-dimensional operation portion,
 the analyzer analyzes whether the moving direction of the position detected is a circumferential direction or a linear direction, and
 the determiner determines that the rotary three-dimensional operation portion is being operated upon the moving direction being analyzed to be the circumferential direction, and determines that the slider-type three-dimensional operation portion is being operated upon the moving direction being analyzed to be the linear direction.

4. The input display device according to claim 1, wherein
 the three-dimensional operation portions include respective operable portions which have three-dimensional shapes to be operated by the operation object, and
 heights of the operable portions of the three-dimensional operation portions are different from one another.

5. The input display device according to claim 1, further comprising a position detector configured to detect a position of the operation object, in response to the operation on the three-dimensional operation portion by the operation object,
 wherein upon arranging the three-dimensional operation portions adjacent to each other, a detected position of the operation object operating on one three-dimensional operation portion overlaps with a detected position of the operation object operating on another three-dimensional operation portion, the one three-dimensional operation portion and the another three-dimensional operation portion being from among the three-dimensional operation portions.

6. The input display device according to claim 1, wherein the display is an on-vehicle display.

* * * * *